United States Patent

[11] 3,608,641

[72] Inventor Arnold George Cottrell
Winnington, England
[21] Appl. No. 797,671
[22] Filed Feb. 7, 1969
[45] Patented Sept. 28, 1971
[73] Assignee Imperial Chemical Industries Limited
London, England
[32] Priority Mar. 1, 1968, Mar. 1, 1968
[33] Great Britain
[31] 10125/68 and 10126/68

[54] PREPARATION OF FIRE-EXTINGUISHING MATERIAL BY HEATING DICYANDIAMIDE WITH ALKALI METAL CARBONATES OR BICARBONATES
4 Claims, No Drawings

[52] U.S. Cl. .................................................. 169/1,
252/2, 252/5, 252/7, 260/551 C
[51] Int. Cl. ................................................ A62c 1/08,
A62d 1/00
[50] Field of Search .................................. 252/2, 4, 5,
7; 260/555, 551 C; 169/1

[56] References Cited
UNITED STATES PATENTS

| | | | |
|---|---|---|---|
| 1,614,698 | 1/1927 | Stillesen ....................... | 260/555 |
| 2,901,428 | 8/1959 | Schulenburg ................ | 252/2 |
| 2,964,468 | 12/1960 | DeBona ........................ | 252/7 |
| 3,484,372 | 12/1969 | Birchall ....................... | 252/2 |

OTHER REFERENCES

Hodgman et al. Handbook of Chemistry and Physics, Chemical Rubber Publishing Company, Cleveland, Ohio 1959, pp. 626 & 627

*Primary Examiner*—John T. Goolkasian
*Assistant Examiner*—D. J. Fritsch
*Attorney*—Cushman, Darby & Cushman

ABSTRACT: Preparation of powdered fire-extinguishing compositions by heating dicyandiamide with alkali metal carbonates or bicarbonates at 160° C.–180° C., preferably in approximately equimolar proportions, and subsequently powdering the products.

PREPARATION OF FIRE-EXTINGUISHING MATERIAL BY HEATING DICYANDIAMIDE WITH ALKALI METAL CARBONATES OR BICARBONATES

This invention relates to novel compositions of matter having the ability to extinguish flames arising from the combustion of liquid and gaseous fuels such as liquid hydrocarbons, hydrogen, methane, and of solid fuels such as wood, paper and textiles. It relates particularly to compositions obtained by reactions between alkali metal bicarbonates and dicyandiamide, $NH=C(NH_2)NH \cdot CN$, and between alkali metal carbonates and dicyandiamide.

When a mixture of dicyandiamide and potassium bicarbonate is heated from room temperature to about 200° C. there is evidence that a reaction occurs at about 160° C. Thus if one heats such a mixture in a differential thermal analyzer at a rate of 20° C. rise per minute up to 200° C. a strong exothermic peak is noticed at 160° C. indicating that a reaction or a physical change of some type has occurred, and since dicyandiamide melts at 207° C. the peak is probably associated with a reaction.

Similarly when a mixture of dicyandiamide and potassium carbonate is heated from room temperature to about 200° C. there is evidence that a reaction occurs at about 140° C. and 170° C. Thus if one heats such a mixture in a differential thermal analyzer at a rate of 20° C. rise per minute up to 200° C. strong exothermic peaks are noticed at 140° C. and 170° C. indicating that a reaction or a physical change of some type has occurred.

Reaction products can indeed be obtained by heating a mixture, for example in approximately equimolar proportions, of dicyandiamide and potassium bicarbonate, or of dicyandiamide and potassium carbonate at 160°–180° C. They possess fire-extinguishing properties, particularly when in the form of finely divided powders that can be projected into flames. For this purpose the mean particle size of the powder is preferably less than 70 microns. Similar products are obtained when sodium bicarbonate or carbonate is used in place of potassium bicarbonate or carbonate respectively.

The invention thus provides a process for making compositions of matter possessing fire-extinguishing properties comprising heating a mixture of dicyandiamide and an alkali selected from carbonates and bicarbonates of sodium and potassium at 160° C. to 180° C.

The invention also includes the fire-extinguishing compositions of matter made by the said process. It is not known at present what the chemical structures of the compositions are beyond the evidence from infrared spectra of the presence of a —COOM group in the molecule where M represents an atom of potassium or sodium.

EXAMPLE 1

Potassium bicarbonate (100 g.) (1.0 mole) and dicyandiamide (84 g.) (1.0 mole) were mixed, spread in a layer approximately 1 inch deep on a tray and heated at 168° C.–170° C. for 2¼ hours. After cooling, the product was finely ground to a maximum particle size of 70 microns.

The fire-extinguishing properties of the powder were assessed in an apparatus designed to test the ability of a powder to extinguish a flame of burning combustible gas, for example hydrogen or coal gas. The apparatus comprises a vertical silica tube approximately 75 cms. long and 2.3 cms. internal diameter open at its upper end and communicating at its lower via a suitable adapter with a narrower tube connected to an air supply. Passing through the side of the silica tube at a point about 68 cms. from the upper end is a tube 104 cms. internal diameter connected to a supply of coal gas, or hydrogen or other combustible gas. The part of this gas-carrying to be inside the silica tube is bent in such a way that 3.0 cms. of its length is disposed along the vertical axis of the silica tube with its open end upwards so that a flame at the open end will burn centrally and vertically within the silica tube.

Communicating via a side tube with the air supply tube is a U-tube which can hold a charge of powdered material. Application of a sudden air pressure to the open end of the U-tube projects the powder into the air supply tube up which it is carried by the airflow so that it envelopes the flame of burning gas. Thus one can compare the flame-extinguishing properties of different powders by measuring the minimum weight of a powder required to extinguish the flame, the other variables, namely rate of gas flow and airflow, and the air pressure applied to the U-tube being of course kept constant.

Using such an apparatus with coal gas as the combustible gas fed at 1.2 litres per minute the relative minimum weights of various powdered materials having mean particle sizes below 70 microns were approximately

|  | |
|---|---|
| $NaHCO_3$ | 3 |
| $KHCO_3$ | 2 |
| product as described in example 1 | 1 |

EXAMPLE 2

Potassium carbonate (138 g.) (1.0 mole) and dicyandiamide (84 g.) (1.0 mole) were mixed, spread in a layer approximately 1 inch deep on a tray and heated at 168° c.–170° C. for 2¼ hours. After cooling the product was finely ground to a maximum particle size of 70 microns.

The fire-extinguishing properties of the powder were assessed in the apparatus described in example 1.

Using it as in example 1 with coal gas as the combustible gas fed at 1.2 litres per minute the relative minimum weights of various powdered materials having mean particle sizes below 70 microns were approximately

|  | |
|---|---|
| $NaHCO_3$ | 3 |
| $KHCO_3$ | 2 |
| product as described in example 2 | 1 |

What we claim is:

1. A process for making compositions of matter possessing fire-extinguishing properties comprising heating a mixture of dicyandiamide and an alkali selected from carbonates and bicarbonates of sodium and potassium at 160° C. to 180° C. wherein the mixture to be heated is in the solid state.

2. A process as claimed in claim 1 in which the dicyandiamide and alkali are mixed in approximately equimolar proportions and the reaction product is subsequently reduced in particle size to give a powder of mean particle size less than 70 microns.

3. Powdered compositions of matter possessing fire-extinguishing properties and made by providing a solid state mixture of dicyandiamide and an alkali selected from carbonates and bicarbonates of sodium and potassium, heating the mixture at 160° C. to 180° C., cooling the product and powdering it until the mean particle size of the powder is less than 70 microns.

4. A method of extinguishing a burning fuel comprising applying to the burning fuel the composition of claim 3.